United States Patent Office 2,832,774
Patented Apr. 29, 1958

2,832,774
STEROIDS

Frank H. Lincoln, Jr., Kalamazoo, and John A. Hogg, Kalamazoo Township, Kalamazoo County, Mich., assignors to The Upjohn Company, Kalamazoo, Mich., a corporation of Michigan No Drawing. Original application December 31, 1954, Serial No. 479,232. Divided and this application September 7, 1956, Serial No. 608,442

3 Claims. (Cl. 260—239.55)

This invention relates to novel α-oxido-20-cyano steroid compounds. This application is a division of application S. N. 479,232, filed December 31, 1954.

It is an object of the present invention to provide novel α-oxido-20-cyano steroids. Another object is the provision of a process for their production. Other objects will be apparent to those skilled in the art to which this invention pertains.

According to the present invention, hydrogen cyanide is added to an α-halo-20-keto steroid to produce the corresponding 20-cyanohydrin which is then converted, in the presence of base, to an α-oxido-20-cyano steroid.

Of the novel compounds of the present invention, i. e., 10,13-dimethylcyclopentanopolyhydrophenanthrenes having, at carbon atom 17, a two carbon atom side chain and having, as sole additional substituents, a cyano group attached to carbon atom 20 and an oxygen function at carbon atom 3 and at at least one of carbon atoms 11, 17 and 21, including an epoxy group alpha to the cyano group, preferred are the 10,13-dimethylcyclopentanoperhydrophenanthrenes which may be represented by one of the following formulae:

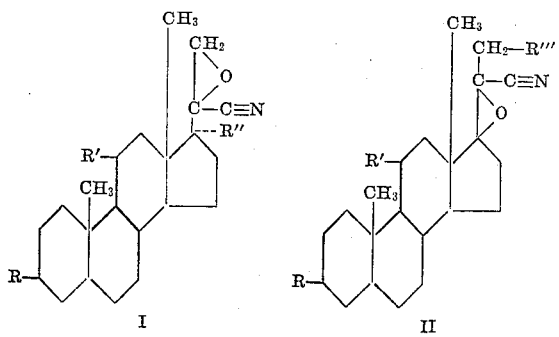

or dehydrogenated analogues thereof having but one double bond which is at one of positions 4(5) and 5(6), wherein R and R' are each selected from the group consisting of α- and β-hydroxy, α- and β-lower-acyloxy wherein the acyl radical is that of a hydrocarbon carboxylic acid containing from one to eight carbon atoms, inclusive, and ketonic oxygen; wherein R" is selected from the group consisting of hydroxy and hydrogen, and wherein R''' is selected from the group consisting of hydrogen, hydroxy and lower-acyloxy wherein the acyl radical is that of a hydrocarbon carboxylic acid containing from one to eight carbon atoms, inclusive. The term "cyclopentanoperhydrophenanthrenes" defines compounds free from carbon-carbon nuclear unsaturation. These compounds are prepared from the corresponding α-halo-20-keto steroids wherein the halo group is a halogen having an atomic weight from 35 to 127, inclusive, preferably bromine.

The compounds of the present invention have antigonadal hormone activity and are emulsifiers. They can be converted to α-hydroxy-20-keto steroids by hydrolysis of the α-oxido-20-cyano group, for example, with potassium hydroxide in aqueous methanol.

α-Hydroxy-20-keto steroids, particularly in the progesterone series, are physiologically active. For example, 17α-hydroxy-progesterone, 21-hydroxyprogesterone, 17α,-21-dihydroxyprogesterone, 11β,17α-dihydroxyprogesterone, 11β,21 - dihydroxyprogesterone, 11β,17α,21 - trihydroxyprogesterone and the corresponding 11-keto compounds are all physiologically active adrenal cortical hormones or adrenal cortical hormone-like steroids.

There are many reaction mechanisms known in the art for the conversion of the compounds of the present invention into at least one of these steroids, e. g., oxidation of a 3- or 11-hydroxy group to a keto group, bromination of a saturated 3-keto compound of the present invention followed by the elimination of HBr to produce a Δ⁴-3-keto system, saponification or hydrolysis of an ester or ether group, followed by the appropriate steps described above, or by other methods known in the art.

In carrying out the process of the present invention, an α-halo-20-keto monohalogenated steroid, wherein the halo is a halogen having an atomic weight from 35 to 127, inclusive, is first converted to a cyanohydrin, e. g., by reaction with an alkali-metal cyanide in the presence of water, other salts of hydrocyanic acid, a cyanohydrin of another ketone, e. g., acetone cyanohydrin, by exchange reaction or hydrogen cyanide and the thus-produced cyanohydrin reacted with a base to produce an α-oxido-20-cyano compound of the present invention. The term hydrogen cyanide wherever used herein is inclusive of the gas hydrogen cyanide, hydrocyanic acid and hydrogen cyanide formed in situ, for example, by the reaction of a salt of hydrocyanic acid with a strong acid.

The addition of hydrogen cyanide to nonsteroidal ketone and steroidal ketones is a known reaction. See Migrdichian, "Organic Cyanogen Compounds," 173 to 179 (1947); Heer and Miescher, Helv. Chim. Acta, 34, 359 to 372 (1951), and Sarett, U. S. Patents 2,541,104, 2,541,105, 2,558,784, 2,558,785 and 2,558,786, and Clomp, U. S. Patent 2,655,517. The addition of hydrogen cyanide to an α-halo-20-keto steroid, however, is a novel reaction.

The intermediate α-halo-20-cyanohydrin is then reacted with a base capable of removing hydrogen halide from the molecule to produce the α-oxido-20-cyano steroids of the present invention.

The production of an α-oxido-20-cyano steroid of the present invention from an α-halo-20-keto steroid is most conveniently accomplished by the reaction of an α-halo-20-keto steroid with an alkali-metal cyanide, e. g., potassium cyanide, in the presence of water. Under these conditions, the potassium cyanide apparently is in equilibrium with water to produce hydrogen cyanide and potassium hydroxide, or other alkali-metal alkoxide if another alkali-metal cyanide is employed. The thus in situ produced hydrogen cyanide reacts to form an α-halo-20-cyanohydrin which then reacts with the alkali-metal alkoxide to produce an α-oxido-20-cyano steroid of the present invention.

This direct converson of an α-halo-20-keto steroid to an α-oxido-20-cyano steroid of the present invention is preferably conducted at a temperature between about zero degrees centigrade and the boiling point of the reaction mixture, preferably between about 25 and 100 degrees centigrade. A convenient temperature is the refluxing temperature of the reaction solvent, if the solvent boils at a temperature somewhat above room temperature but below 100 degrees centigrade.

Alternatively, the starting α-halo-20-keto steroid of the present invention can be converted to a cyanohydrin, according to the methods discussed hereinbefore and a base, preferably anhydrous, then introduced into the reaction mixture or, reacted with the isolated α-halo-20-cyanohydrin. Bases which can be employed, although their efficiency and the yield of α-oxido-20-cyano steroid produced by them may vary considerably, include the alkali-metal hydroxides, e. g., potassium or sodium hydroxide, the alkali-metal carbonates, the alkali-metal acetates and formates, the heterocyclic aromatic amines, e. g., pyridine, collidine, etc. and the other agents commonly employed for the purpose of dehydrohalogenation.

Solvents which may be employed include the solvents essentially nonreactive under the reaction conditions, e. g., ethanol, methanol, acetone, methyl ethyl ketone, chloroform, methylene chloride, mixtures of these, and pyridine, acetic acid, etc.

The following examples are illustrative of the process and products of the present invention but are not to be construed as limiting.

*Example 1.—3α,17α-dihydroxy-20-cyano-20:21-oxidopregnane-11-one*

A mixture of 3.00 grams (0.007 mole) of 3α,17α-dihydroxy-21-bromopregnane-11,20-dione and 1.5 grams of sodium cyanide, dissolved in a mixture of 120 milliliters of ethanol and twenty milliliters of water was boiled gently for ten minutes. The reaction mixture was cooled, diluted with a large volume of water and the steroidal precipitate filtered, washed with water and dried. There was thus-produced 1.60 grams of 3α,17α-dihydroxy-20-cyano-20:21-oxidopregnane-11-one melting at 227 to 231 degrees centigrade. Two recrystallizations from a mixture of ethyl acetate and Skelly-solve B hexane hydrocarbons gave 3α,17α-dihydroxy-20-cyano-20:21-oxidopregnane-11-one having a melting point of 243 to 246 degrees centigrade and the analysis below.

Calculated for $C_{22}H_{31}NO_4$: C, 70.75; H, 8.37; N, 3.75. Found: C, 70.90, 70.57; H, 8.25, 8.30; N, 3.71.

*Example 2.—3β,17α-dihydroxy-20-cyano-20:21-oxidopregnane-11-one*

Following the procedure exactly as described in Example 1, but using 3β,17α-dihydroxy-21-iodopregnane-11,20-dione as the starting steroid, there is produced 3β,17α-dihydroxy-20-cyano-20:21-oxidopregnane-11-one.

*Example 3.—3α-acetoxy-17:(20)-oxido-20-cyanopregnane-11-one*

A mixture of 250 milligrams of 3α-acetoxy-17α-bromopregnane-11,20-dione dissolved in 25 milliliters of denatured ethyl alcohol and ten milliliters of water containing 55 milligrams of sodium cyanide was shaken at room temperature for 21 hours. The mixture was diluted with 100 milliliters of water and the precipitate separated by filtration, washed with water and dried. There was thus-obtained 210 milligrams of a white powder melting at 96 to 101 degrees centigrade and giving a negative Beilstein test for halogen. This precipitate was dissolved in methanol and reprecipitated with water to give a reaction product consisting mainly of 3α-acetoxy-17:(20)-oxido-20-cyanopregnane-11-one plus some 3α-hydroxy-17:(20)-oxido-20-cyanopregnane-11-one and melted at 99 to 103 degrees centigrade. Infrared analysis was consistent with the structure of the two ingredients, showing the product to consist primarily of the 3-acetoxy compound. The carbon hydrogen nitrogen analysis was consistent with the calculated structure of the 3-acetoxy compound.

Calculated for $C_{24}H_{33}NO_4$: C, 72.15; H, 8.33; N, 3.50. Found: C, 71.85; H, 8.44; N, 3.34.

Chromatography of the slightly impure 3α-acetoxy-17:(20)-oxido-20-cyanopregnane-11-one over synthetic magnesium silicate is productive of the pure compound as well as the pure 3-hydroxy compound, eluted after the 3-acetoxy compound.

*Example 4.—20-cyano-20:21-oxido-4-pregnene-3,11-dione*

Following the procedure described in Example 1, but using 11-keto-21-iodoprogesterone (U. S. 2, 683,724) as starting steroid, there is produced 20-cyano-20:21-oxido-4-pregnene-3,11-dione.

Similarly, substituting 11α-hydroxy-21-iodoprogesterone or 11β-hydroxy-21-iodoprogesterone (U. S. 2,683,724) as the starting steroid in the reaction of Example 1, there is produced 11α-hydroxy-20-cyano-20:21-oxido-4-pregnene-3-one and 11β-hydroxy-20-cyano-20:21-oxido-4-pregnene-3-one, respectively.

Other examples of known 20-keto-21-halo steroids which are converted to the corresponding 20-cyano-20:21-oxido steroids according to the procedure described in Example 1 include 3β-hydroxy-21-bromopregnane-20-one, 21-chloroallopregnane-3,20-dione, 21-chloropregnane-3,20-dione, 3β-hydroxy-21-chloro-5-pregnene-20-one, 3β-hydroxy-21-chloropregnane-20-one, 3β-acetoxy-21-bromo-16-pregnene-20-one, 3β-acetoxy-21-bromo-5-pregnene-20-one, 3β-hydroxy-21-iodo-5-pregnene-20-one and 3β-acetoxy-21-chloro-pregnane-20-one.

Other examples of known 17-halo-20-keto steroids which are converted to the corresponding 17:20-epoxy-20-cyano steroids according to the procedure described in Example 3 include 3-hydroxy-17-bromoallopregnane-20-one, 3-hydroxy-17α-bromopregnane-20-one, 3β-acetoxy-17α-bromopregnane-20-one, 3β-acetoxy-17α-bromoallopregnane-20-one, 3β-acetoxy-17α-chloroallopregnane-20-one, 3β,21-diacetoxy-17α-bromoallopregnane-20-one and the maleic anhydride adduct of 3β-acetoxy-9:11-oxido-17α-bromo-5,7-pregnadiene-20-one, 17α-bromopregnenolone.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A compound of the following structural formula:

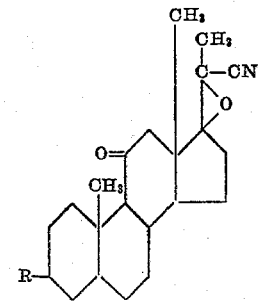

in which R is a member of the group consisting of hydroxy and acyloxy wherein each acyl group is that of a hydrocarbon carboxylic acid of from one to eight carbon atoms, inclusive.

2. A 3-acyloxy-17:(20)-oxido-20-cyanopregnane-11-one in accordance with claim 1.

3. 3α-acetoxy-17:(20)-oxido-20-cyanopregnane-11-one.

References Cited in the file of this patent

UNITED STATES PATENTS 2,302,135     Miescher et al.            Nov. 17, 1942

OTHER REFERENCES

Minlon et al.: JACS 76, pp. 2396–2399 (1954).